(12) United States Patent
Breiter et al.

(10) Patent No.: US 7,711,843 B2
(45) Date of Patent: May 4, 2010

(54) METHOD AND A DEVICE FOR MAKING A MEDIA FILE ACCESSIBLE VIA A WEB PAGE

(75) Inventors: Gerd Breiter, Wildberg (DE); Hendrik Wagner, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 897 days.

(21) Appl. No.: 11/135,997

(22) Filed: May 24, 2005

(65) Prior Publication Data

US 2006/0015581 A1    Jan. 19, 2006

Related U.S. Application Data

(63) Continuation of application No. PCT/EP03/07981, filed on Jul. 22, 2003.

(30) Foreign Application Priority Data

Nov. 26, 2002    (EP) .................................. 02026224

(51) Int. Cl.
 *G06F 15/16* (2006.01)
 *G06F 15/173* (2006.01)
(52) U.S. Cl. .................. 709/237; 709/231; 709/232; 709/217; 709/238
(58) Field of Classification Search ................. 709/203, 709/231, 232, 217, 237, 238
 See application file for complete search history.

(56) References Cited

U.S. PATENT DOCUMENTS

| 6,415,316 | B1 * | 7/2002 | Van Der Meer | 709/203 |
| 6,430,688 | B1 * | 8/2002 | Kohl et al. | 713/156 |
| 2002/0025045 | A1 | 2/2002 | Raike | 380/280 |
| 2002/0085713 | A1 | 7/2002 | Feig et al. | 380/200 |
| 2002/0194195 | A1 * | 12/2002 | Fenton et al. | 707/104.1 |
| 2003/0084179 | A1 | 5/2003 | Kime et al. | 709/231 |
| 2005/0235324 | A1 * | 10/2005 | Makipaa et al. | 725/60 |
| 2008/0059532 | A1 * | 3/2008 | Kazmi et al. | 707/104.1 |

FOREIGN PATENT DOCUMENTS

| WO | WO 02/10962 A1 | 2/2002 |
| WO | WO 02/39718 A1 | 5/2002 |

* cited by examiner

*Primary Examiner*—Ario Etienne
*Assistant Examiner*—Sahera Halim
(74) *Attorney, Agent, or Firm*—Geraldine D. Monteleone; Arthur Ortega

(57) ABSTRACT

A first aspect addresses a method and device for making a media file accessible via a web page. First, a web design tool receives a media file to be made accessible via a web page. Then, said media file is sent to a streaming service provider. Subsequently, a key generated by said streaming service provider allowing to unambiguously identifying said sent media file is received and an identifier derived from said key is placed into the web page through which the media file should be accessed. A second aspect addresses a method and device installed at the streaming service provider's side for serving a user's request for hosting a media file to be streamed to a visitor's computer on its request.

5 Claims, 4 Drawing Sheets

METHOD AND A DEVICE FOR MAKING A MEDIA FILE ACCESSIBLE VIA A WEB PAGE

The present application is a continuation of International Patent Application PCT/EP03/07981 filed Jul. 22, 2003 as a PCT application which is a continuation of EP Patent Application 02026224.2 filed Nov. 26, 2002, now abandoned.

BACKGROUND OF THE INVENTION

1. Field of the Invention

The present invention generally relates to an environment for automated generation of web pages interfacing rich media. Particularly, the present invention relates to a method and a device is provided for making a media file accessible via a web page and, correspondingly, to a method and device installed at the streaming service provider's side for serving a user's request for hosting a media file to be streamed to a visitor's computer on its request.

2. Description of the Related Art

Rich media data extends traditional computer data formats into more natural data formats for the interaction of humans and computers by incorporating images, motion pictures, voice, audio, and video. Leading market, business, social, and technical indicators point to the growing importance of such digitally recorded content.

Furthermore, rich media data is getting more and more pervasive in Internet applications. All those Internet applications have different requirements and use cases, but they are all working with alike content data. Due to this fact, Internet applications are getting really complex and not easily customizable to individual requirements.

One of the key issues with rich media data is, however, transferring the huge amount of data through a network. In the past, data is transferred using the store & forward paradigm, i.e., the complete content is transferred before the data is presented. A prominent implementation of this paradigm is the File Transfer Protocol (FTP), one of the standard ways to transfer files throughout the World Wide Web. For conventional data this works fine, as the amounts of data to be transferred are comparably small. For audio and video clips, though, the latency time that passes between a request for rendering and the start of the rendering gets impractically long.

A couple of years ago another paradigm called streaming has emerged. Streaming allows the rendering of media to take place in parallel with the transfer of its content, which reduces latency times to a minimum. Streaming software always comes in pairs, a stream server pumping data continuously through the network and a player receiving the data and rendering it.

The player is always the part requesting a streaming data connection. While establishing such a data connection, the client sends so called meta data to the stream server, which identifies the requested rich media data object. In general, the meta data is used by the stream server to find the rich media object within its cache, but the meta data can also contain further information like access tickets, bandwidth information, offsets within the media etc.

In order to ensure the quality of the data stream, which in general means that the required bandwidth could be written to the network throughout the entire stream duration, current stream server require the rich media data object to reside on the local file system. So, every stream server, which likes to stream a rich media data object has to keep a copy within its local disk cache. Furthermore, a stream server has to be aware of the available system resources like CPU, memory, disk I/O capabilities, network connectivity, etc. If a new streaming request exceeds one of its resources the request has to be rejected in order to ensure the quality of established data streams.

In a distributed scenario like the Internet there could be a long distance between the stream server and the player. The data has to be transferred over an unknown number of nodes with an unpredictable overall bandwidth. So-called edge-servers are established to solve such kind of problems.

As described above, the creation and configuration requirements become more and more complex by using rich media content data applied with the services required or offered combining rich media data within today's Internet applications. Moreover, the time to market for these rich media Internet applications becomes shorter and shorter which forces requirements to handle these infrastructure and administration requests in very short time periods to be accessed from all over the world.

What can be seen from the above descriptions is that rich media services require a very complex infrastructure. In order to get acceptable media streaming services, a huge amount of distributed servers (edge-servers), hosting proxies services, distribution and caching services, streaming services, billing services, advertising services and metering services—to enable short access latency time—are required.

Building up, operating and maintaining this infrastructure with 24/7 QOS is very complex and expensive and needs high skilled operation personal. The entire infrastructure needed to present rich media in the Internet is quite expensive. In some of the business models this leads to unacceptable expenses for the users using these media offerings.

Therefore systems are currently appearing which offer Media Services to companies wanting to stream rich media to their end users without having the necessity to install and maintain all the infrastructure for streaming like stream servers, edge servers etc. The company who wants to include rich media into their Web Site can upload the media by simply invoking a standardized Web Service preferably with the help of a SOAP/XML like interface. A key is returned referring to that media and the company has as a subsequent step to include a CGI script or servlet into their Web Site which interacts with a second Web Service to get the so called Meta Media which the CGI script or servlet has to send to the browser of the end user requesting the rich media, so that the browser can finally contact the Media Service in order to get the requested content streamed to his system.

What can be seen from the above said is, that it is rather complex for a Web Designer to include rich media, even if a Media Service is used. Specific servlets or CGI scripts have to be programmed and included in the HTML pages and the designer of the Web Page has to know about streaming technologies, Meta Media and their proprietary formats, SOAP and other media related areas.

OBJECT OF THE INVENTION

Starting from this, the object of the present invention is to provide a method and a system that facilitates the procedure of providing rich media content in the Internet.

BRIEF SUMMARY OF THE INVENTION

The foregoing object is achieved by a method and a system as laid out in the independent claims. Further advantageous embodiments of the present invention are described in the sub claims and are taught in the following description.

According to a first aspect of the present invention a method and a device is provided for making a media file accessible via a web page, whereby the media file gets streamed from a streaming service provider to a visitor's computer on its request all being reachable via a network. First, a web design tool receives a media file to be made accessible via a web page. Then, said media file is sent to a streaming service provider. Subsequently, a key generated by said streaming service provider allowing to unambiguously identifying said sent media file is received and an identifier derived from said key is placed into the web page through which the media file should be accessed.

A second aspect of the present invention addresses a method and device installed at the streaming service provider's side for serving a user's request for hosting a media file to be streamed to a visitor's computer on its request. Initially, a media file to be streamed is received by the streaming service provider from a user. Then the media file is stored and a key allowing to unambiguously identifying said received media file is prepared. Subsequently, the key is sent to the user.

In other words, the idea of the present invention is to provide an easy-to-use interface for users having to enrich their web site with rich media content and a respective procedure for a streaming service provider that wants to offer the service.

Through an invocation of a method for placing a media file into a web page, the media file gets uploaded to the media database of a streaming service provider. A key referencing the content is returned from the streaming service provider. Such upload call may for example be implemented through SOAP Interface.

An html-file is generated using the keys to reference the uploaded content. It can contain for example calls to CGI's or servlets, which take all necessary actions to generate the required information that is needed by the browser/player of a visitor's computer who wants to stream rich media from the user's web site. This can be for example the issue of a SOAP call to the streaming service provider, in order to get a necessary metafile. The web design tool may add the link to the generated html file in the html page.

Whenever a visitor visits the user's web site and follows the link in order to play the media (the generated data are sent back to the visitor's browser), the browser reads the generated meta file and opens a player with the appropriate control information, so the player is able to contact the correct stream server and to start playing immediately.

The tooling described with respect to the present invention may be integrated in various web design tools, such as WebSphere Studio by IBM Corporation, in order to ease the process of integrating rich media into web sites of a user or a company without having the necessity to know anything about the required infrastructure.

However, it cannot only be used with the web services described above, but may also be used to ease the usage of a streaming service provider's infrastructure supplied and installed with the product like WebSphere by IBM Corporation, or other Web Application Systems.

If more and more web services for rich media will appear over time these tools may be extended to use 'yellow pages', i.e., a directory service, like UDDI, in order to get dynamically to specified rich media web services and automatically select the most appropriate service, get knowledge about the required interface of the selected service and automatically generate the correct parameters to fulfill that interface.

BRIEF DESCRIPTION OF THE SEVERAL VIEWS OF THE DRAWINGS

The above, as well as additional objectives, features and advantages of the present invention, will be apparent in the following detailed written description.

The novel features of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DETAILED DESCRIPTION OF THE INVENTION

Figure 1:
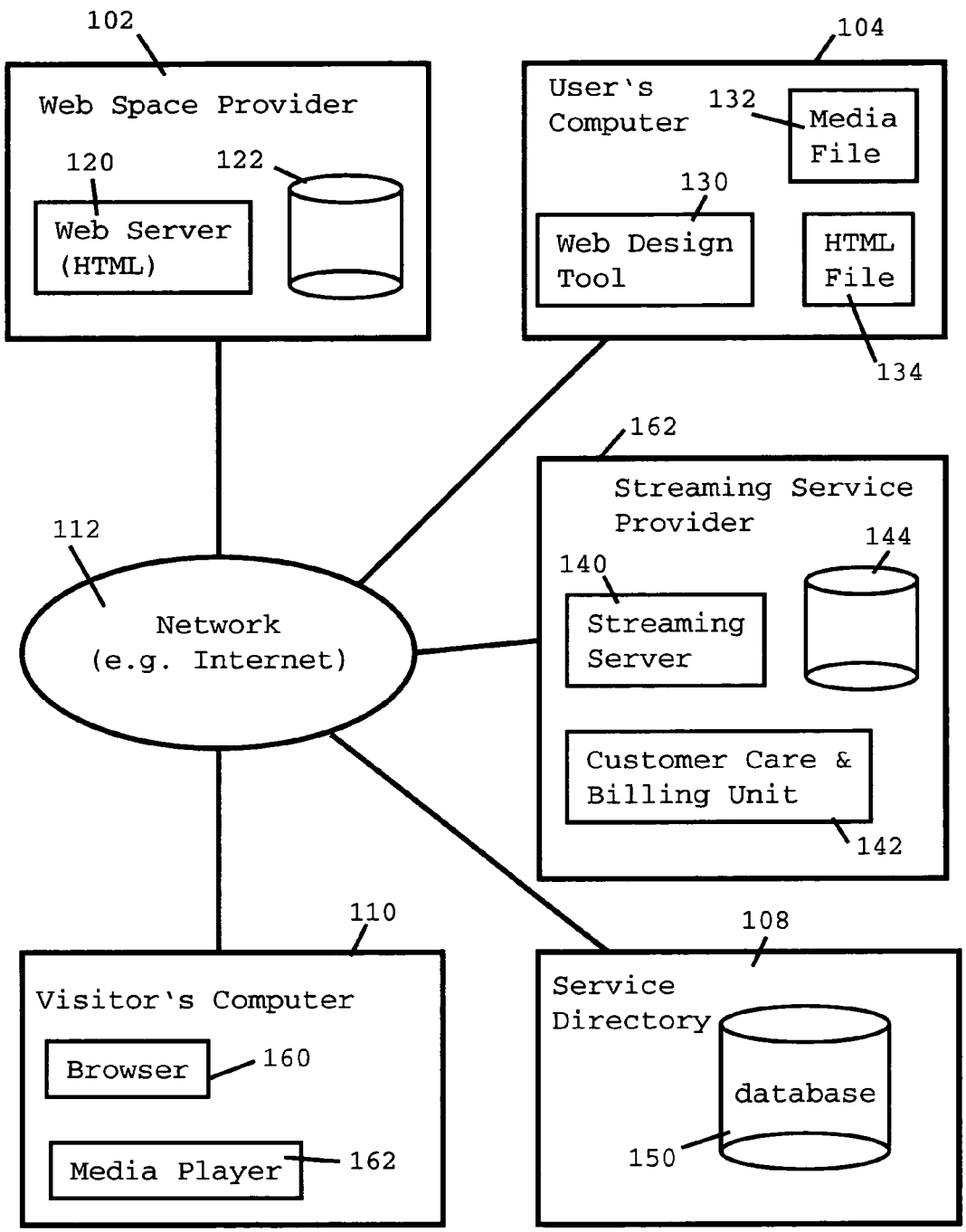
FIG. 1 shows block diagram illustrating an environment in which the method and device according to the present invention may be used.

With reference to FIG. 1, there is depicted a block diagram illustrating an environment 100 in which the method and device according to the present invention may be used. A web space provider 102, a user' computer 104, a streaming service provider 106, a service directory 108 and a visitor's computer are connected to a network 112, such as the Internet.

The web space provider 102 offers users to host Internet pages, e.g., written in html (hypertext markup language). It comprises a web server 120 and data storage 122. The web server 120 delivers hosted pages to requesters, such as the visitor's computer 110. A WebSphere web server by International Business Machines Corporation, an Apache web server by The Apache Software Foundation, or a Weblogic web server by BEA SYSTEMS, INC may realize the web server. The data storage 122 keeps the hosted pages. It may be implemented by using a data base system, such as DB2 by International Business Machines Corporation, or a data base system by Oracle Corporation or Sybase Inc.

The user's computer 104 includes a web design tool 130, at least one media file 132 and at least one html-file 134. The web design tool 130 may be formed WebSphere Studio by IBM Corporation.

The streaming service provider 106 offers users to take care of streaming media files over the network 112, e.g., the Internet. A streaming server 140, such as IBM Video Charger, a Real Server by RealNetworks, Inc., or a Quicktime stream server by Apple Computers Inc, installed at the streaming service provider 106 performs the streaming itself. Furthermore, the streaming service provider 106 comprises a customer care & billing unit 142 and a storage subsystem 144. The customer care & billing unit handles the payment procedure for the services provided by the streaming service provider 106. It may be configured to accept credit card or debit card payments. The storage subsystem 144 keeps the media files to be steamed to a requester, such as the visitor's computer 110, over the network 112, e.g., the Internet.

The service directory 108 may be realized as a UDDI directory (Universal Description, Discovery and Integration) acting as a broker between web service provider and respective customer. The web design tool 130 may, on user's request, look for a suitable web space provider 102 or a suitable streaming service provider 106 connected to the network 112. In return, the service directory 108 provides a list of possibilities and a selection can be made according to given service properties, such as functionality, quality of service and costs. A database 150 included in the Service directory keeps the required information about the services. It is acknowledged that instead of looking for a suitable provider in the service directory 108, a default provider or a provider named by the user may be used instead.

The visitor's computer 110 represent any number of visitor's machines in the network 112, e.g., the Internet, requesting streaming media content from a user's web page hosted by the web space provider 102 and streamed by the streaming service provider 106. It includes a browser 160, e.g., formed by a Microsoft Internet Explorer or Netscape Navigator browser, for rendering the requested html pages and a media player 162 for rendering the requested media file, such as Quicktime media player by Apple Computers Inc., RealPlayer media player by RealNetworks Inc., or Windows Media Player by Microsoft Inc.

It should be noted that the web space provider 102 and the streaming service provider 106 may be formed by one single entity without departing from the subject matter of the present invention.

Figure 2:
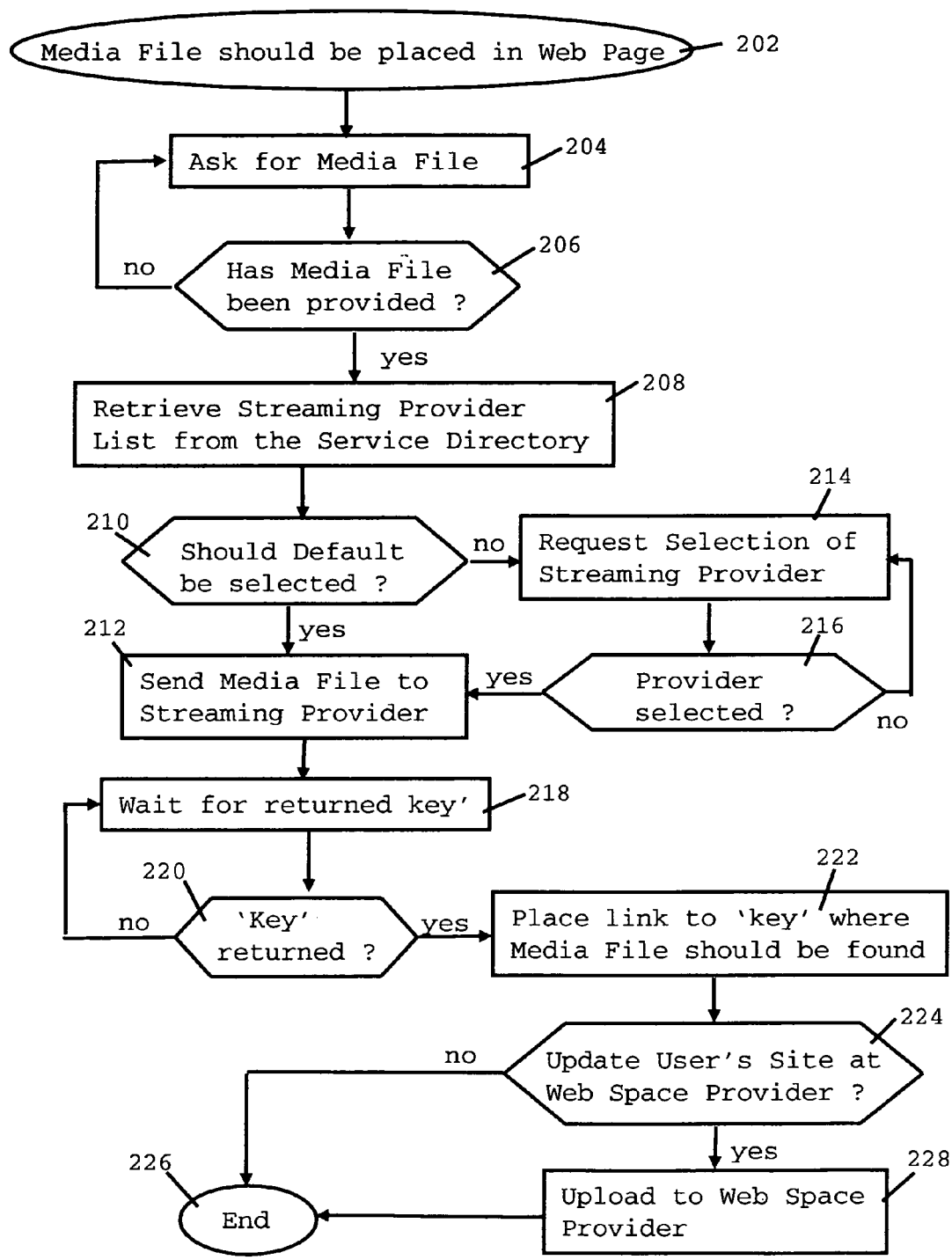
FIG. 2 shows a flow chart illustrating a method according to the present invention to be implemented in a web design tool for developing and designing pages, i.e., to be published in the Internet.

With reference now to FIG. 2, there is depicted a flow chart illustrating a method according to the present invention to be implemented in a web design tool for developing and designing pages, i.e., to be published in the Internet. A user desires to link a media file into a web page in a way that a visitor browsing the web page is enabled to initiate streaming of the media file to the visitor's media player (block 202). First the web design tool prompts the user and asks for a media file to be linked with the page (block 204). Then, it determines whether or not the media file has been provided (block 206). If no, it asks again. It is acknowledged that the web design tool additionally provides other standard functionality to the user, such as, to abort an action, to undo a step, to exit the application. However, for the sake of clarity only the steps are shown in the flow charts said are closely related to the present invention and preferred embodiments thereof.

If yes, the web design tool retrieves a list of available streaming providers from the service directory (block 208). Alternatively, a suitable streaming server may be specified in preference settings of the web design tool to be used without requesting a list of streaming servers from the service directory.

In accordance with the illustrated method, in the preference settings of the web design tool a default streaming service provider is specified and the web design tool prompts the user to verify whether or not the specified default streaming service provider should be used (block 210). If yes, the web design tool sends the media file to the streaming service provider (block 212). If no, the user is prompted to select a streaming server from the list retrieved from service directory (block 214). In order to facilitate the selection process, details about the provider's terms and conditions, such as pricing and quality of service, may be displayed to the user. Then, it is determined whether or not one streaming service provider has been selected (block 216). If no, the request for selection is maintained. If yes, the web design tool sends the media file to the streaming service provider (block 212).

In the following, the web design tool waits for a key to be returned from the streaming service provider. Any identifier that may be used to unambiguously identifying the media file uploaded to the streaming service provider forms the key, such as a meta file containing all the details necessary to start streaming the media file, a link to a servlet, i.e., Java programs that run as part of a network service, or a reference to the media file in the streaming service provider's storage subsystem. Then, it determines whether or not the key has been returned (block 220). If no, the web design tool stays in the waiting state (block 218). If yes, it places a link to the key or the key itself into the html page in which the media file should be launched from. In case the streaming service provider returns a link as a key, then the key may be used without further modifications. However, in case, the key is formed by a meta file, then a link to said file may be placed in the html page instead.

Subsequently, the web design tool prompts the user whether or not the user's site at the web space provider should be updated. If no, the procedure ends (block 226). If yes, the web design tool establishes a connection to the web space provider in order to upload the changes to the user's web site (block 228). Then the procedure ends (block 226).

Figure 3:
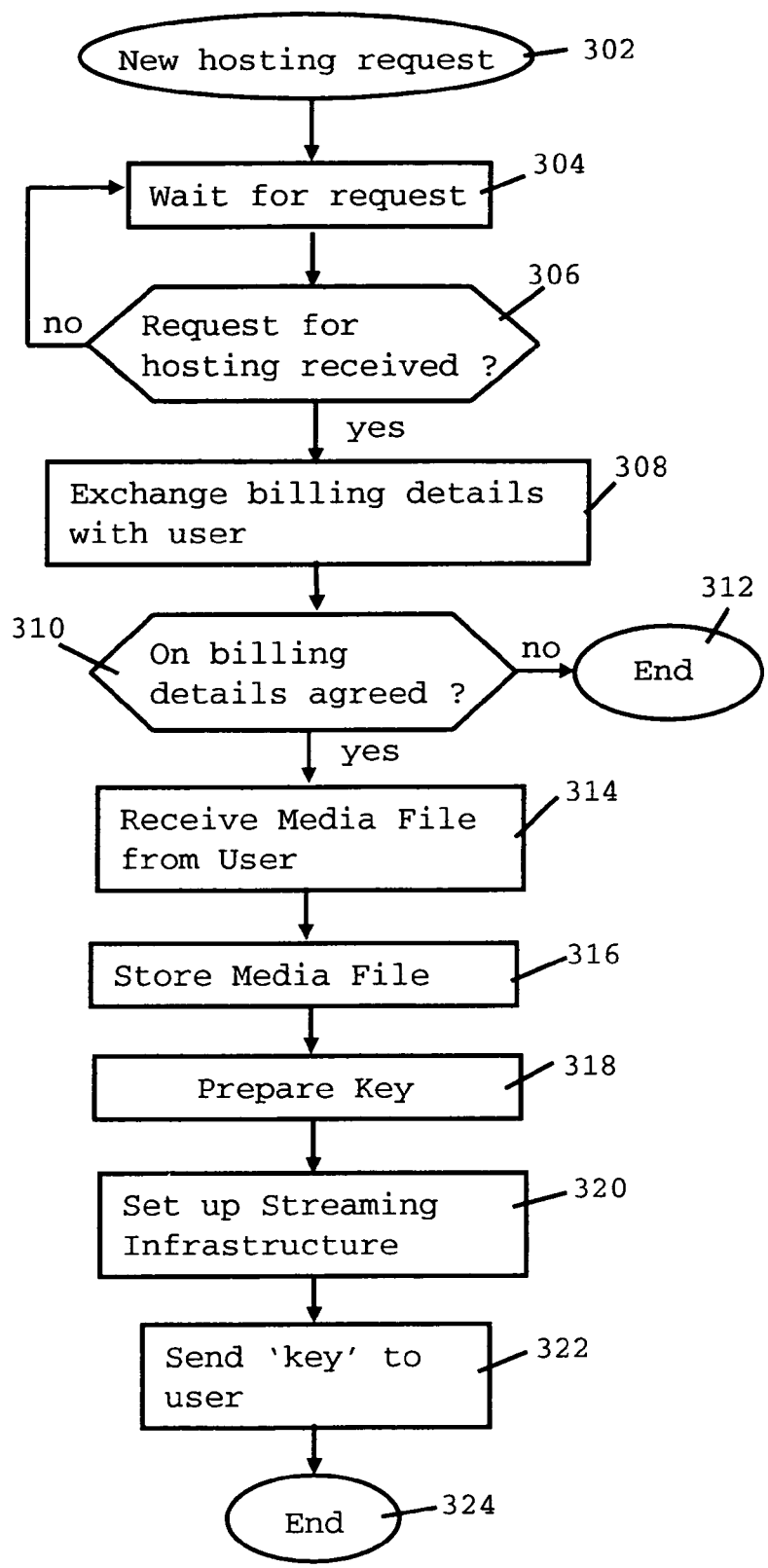
FIG. 3 shows a flow chart illustrating a method according to the present invention to be implemented by a Streaming Service Provider in order to accept new hosting requests.

With reference to FIG. 3, there is depicted a flow chart illustrating a method according to the present invention to be implemented by a Streaming Service Provider in order to accept new hosting requests (block 302). Initially, the streaming service provider is waiting for a new request from a user to host a media file to be streamed (block 304) and determines whether or not a hosting request has been received (block 306). If no, the streaming service provider stays in the waiting state (block 304). If yes, billing details are exchanged with the customer, i.e., the user requesting the hosting service (block 308). This may include the exchange of credit or debit card numbers, or information about a customer account in case the customer is a subscriber of the streaming service provider.

If the user and the streaming service provider could not agree on billing details (block 310), the procedure ends (block 312). In case they could, the streaming service provider receives a media file sent by the user (block 314) and stores the media file in its storage subsystem (block 316). Subsequently, the streaming service provider prepares a key to be returned to the user (block 318). As aforementioned, the key may be formed by any identifier that may be used to unambiguously identifying the media file uploaded to the streaming service provider, such as a meta file containing all the details necessary to start streaming the media file, a link to a servlet or a reference to the media file in the streaming service provider's storage subsystem.

Then, the streaming service provider sets up the streaming infrastructure (block 320), which may include starting the appropriate streaming server suitable for streaming the received media file, preparing meta files, or analyzing the media file in order to get information about the bandwidth requirements.

Finally, the streaming service provider sends the key to the user (block 322), before the procedure ends (block 324). As explained with reference to FIG. 2, the user may incorporate the key into his/her web site to be accessed by visitors. In the following the method is described allowing a visitor to watch the user's media file.

Figure 4:
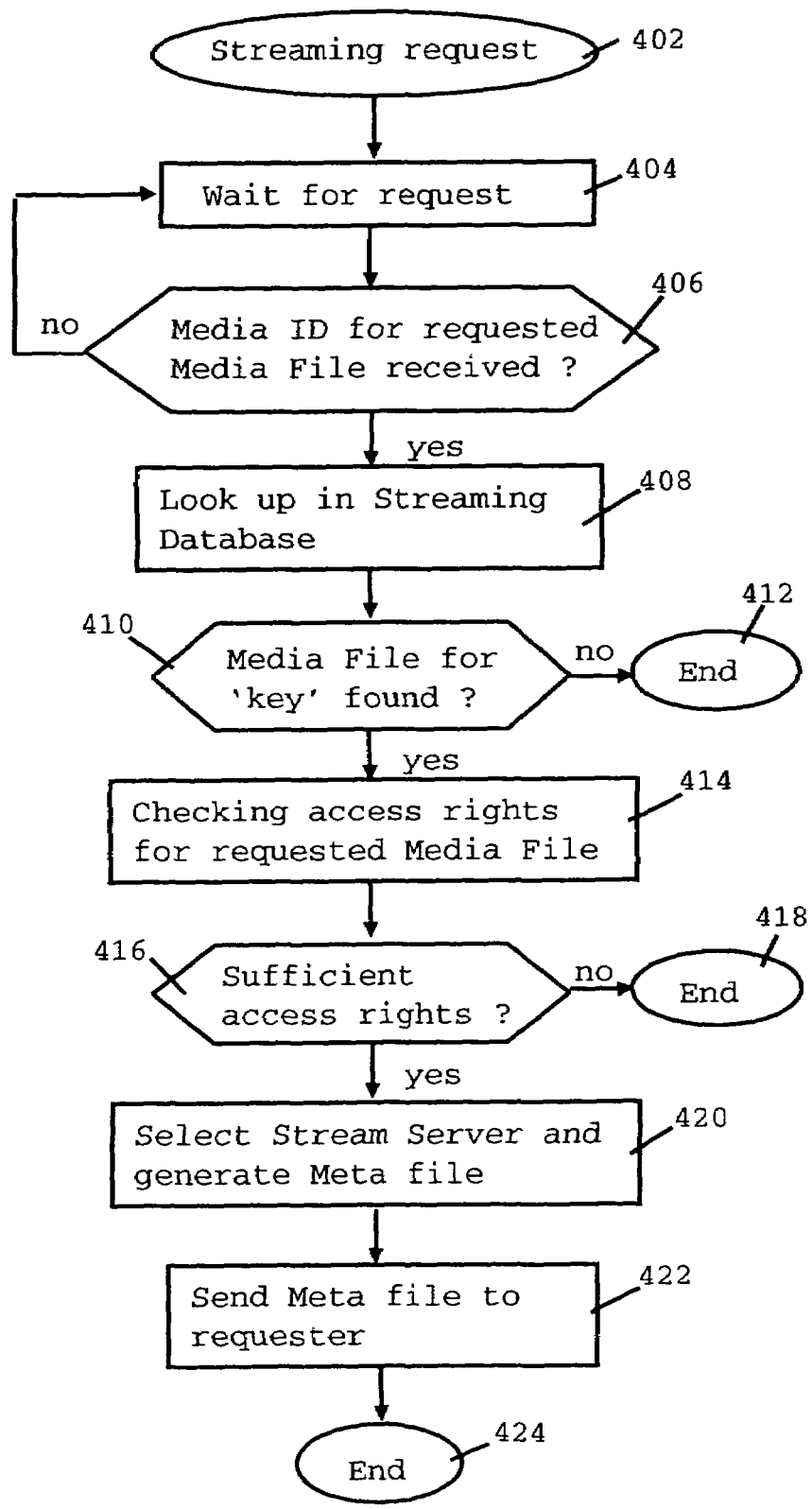
FIG. 4 shows a flow chart illustrating a method according to the present invention to be implemented by a Streaming Service Provider in order to deliver streaming server to a requester.

With reference now to FIG. 4, there is depicted a flow chart illustrating a method according to the present invention to be implemented by a Streaming Service Provider in order to deliver streaming server to a requester (block 402), e.g., the visitor (cf. FIG. 1). Initially, the streaming service provider is waiting for a new request to stream a media file (block 404). A visitor of the user's web site who wishes to watch a particular media file referred to on a user's web page initiates such a request. Then, the streaming service provider determines whether or not a streaming request has been received including a respective media id (block 406). The key generated by the streaming service provider (cf. description to FIG. 3) or a request generated by a servlet started from the user's web page may form the media id.

If no, the streaming service provider stays in the waiting state (block 404). If yes, the streaming service provider looks up in a streaming database, e.g., in the respective storage subsystem, in order to find the media file corresponding to the media id or the key (block 308).

If a media file corresponding to the key could not be found (block 310), the procedure ends (block 312). In case it could, the streaming service provider checks the access rights from the requester for the requested media file (block 314). Then, the streaming service provider determines whether or not the requester has sufficient access rights for the requested media file (block 416). If no, the procedure ends and streaming of the requested media file does not take place (block 418). If yes, the streaming service provider selects an appropriate stream server and generates the corresponding meta file (block 420). The selection of the appropriate stream server may include a load-balancing step in order to distribute the load of streaming amongst several streaming servers.

Finally, the streaming service provider sends the meta file to the requester, i.e., the visitor (block 422), before the procedure ends (block 424).

The present invention can be realized in hardware, software, or a combination of hardware and software. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

The invention claimed is:

1. A computer implemented method for making a media file accessible via a web page, whereby the media file is streamed from a streaming service provider to a computer over a network, the method comprising:
   receiving from a user computer a media file to be made accessible via a web page;
   retrieving a streaming service provider list from a service directory, wherein said lists comprises provider terms and conditions;
   verifying a specified default streaming service provider from said list;
   after verification of said specified default streaming service provider, selecting at least one streaming service provider from said list;
   sending billing arrangement information from said selected streaming service provider to said user computer;
   after said user computer agrees to said billing arrangement information, sending said media file to said selected streaming service provider;
   receiving a key generated by said streaming service provider for allowing identification of said sent media file;
   placing an identifier derived from said key into the web page through which the media file is accessible;
   establishing a connection to a web space provider;
   sending to the web space provider changes to the web page including changes based on said identifier derived from said key;
   receiving from a requester a request to receive the media file and the request includes the identifier and access rights information of the requester to access said media file;
   checking access rights information of the requester;
   generating a meta file based on said identifier; and
   sending said meta file to the requester if the access rights information is sufficient to grant access to the requester to the media file.

2. The method according to claim 1, wherein a servlet is forming said key.

3. The method according to claim 1, wherein a meta file is forming said key.

4. The method according to claim 1, wherein a meta file is forming said identifier derived from said key.

5. The method according to claim 1, wherein a servlet is forming said identifier derived from said key.

\* \* \* \* \*